N. A. PATTERSON.
Propeller-Wheel.

No. 169,287.

3 Sheets--Sheet 1.

Patented Oct. 26, 1875.

WITNESSES
Chas. J. Gooch
Henry Tanner

INVENTOR
Newton Alexander Patterson
By Knight Bros. Attorneys

N. A. PATTERSON.
Propeller-Wheel.

No. 169,287. Patented Oct. 26, 1875.

3 Sheets--Sheet 2.

WITNESSES
Chas. J. Gooch
Henry Tanner

INVENTOR
Newton Alexander Patterson
By Knight Bros. Attorneys

N. A. PATTERSON.
Propeller-Wheel.

No. 169,287. Patented Oct. 26, 1875.

WITNESSES
Chas J. Gooch
Henry Tanner

INVENTOR
Newton Alexander Patterson.
By Knight Bros Attorneys

UNITED STATES PATENT OFFICE.

NEWTON A. PATTERSON, OF JOHNSON, TENNESSEE.

IMPROVEMENT IN PROPELLER-WHEELS.

Specification forming part of Letters Patent No. 169,287, dated October 26, 1875; application filed April 23, 1875.

*To all whom it may concern:*

Be it known that I, NEWTON A. PATTERSON, of the city of Johnson, in the county of Washington and State of Tennessee, have invented certain new and useful Improvements in Propellers for Vessels, of which the following is a specification:

The subject of this invention is what I term a twin-paddle propeller; a pair of paddle-wheels, each consisting of two or more blades, projecting obliquely from a shaft slightly inclined from a vertical position, in such a manner as to cause the blades to assume a horizontal position in the effective part of their revolution, to enter and leave the water nearly edgewise, or in a plane parallel to the line of motion of the vessel, and to pass forward out of the water in nearly vertical position in the return part of the revolution.

Figure 1:
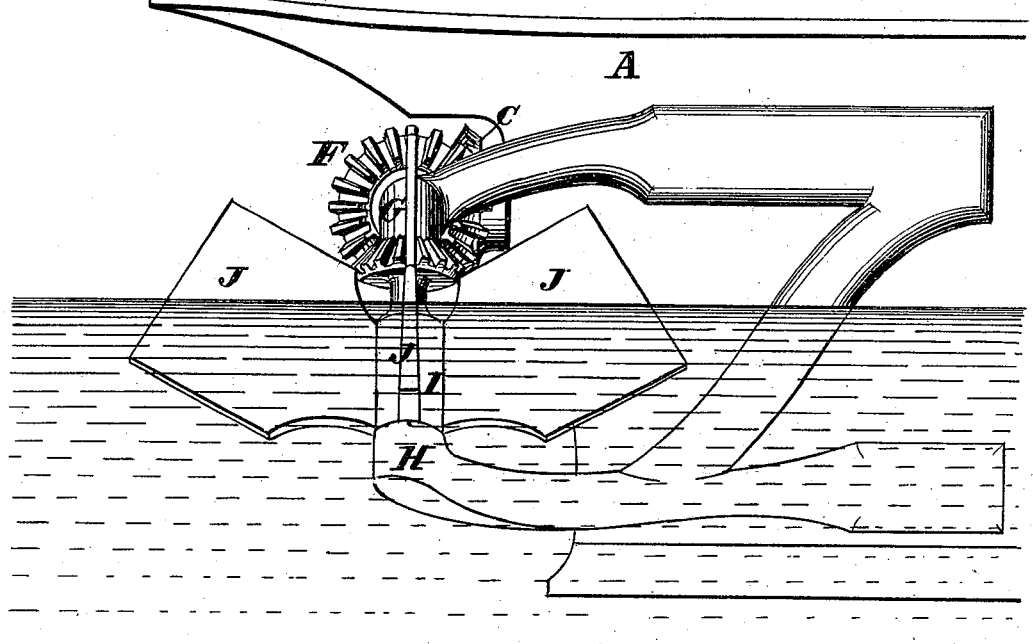
Figure 2:
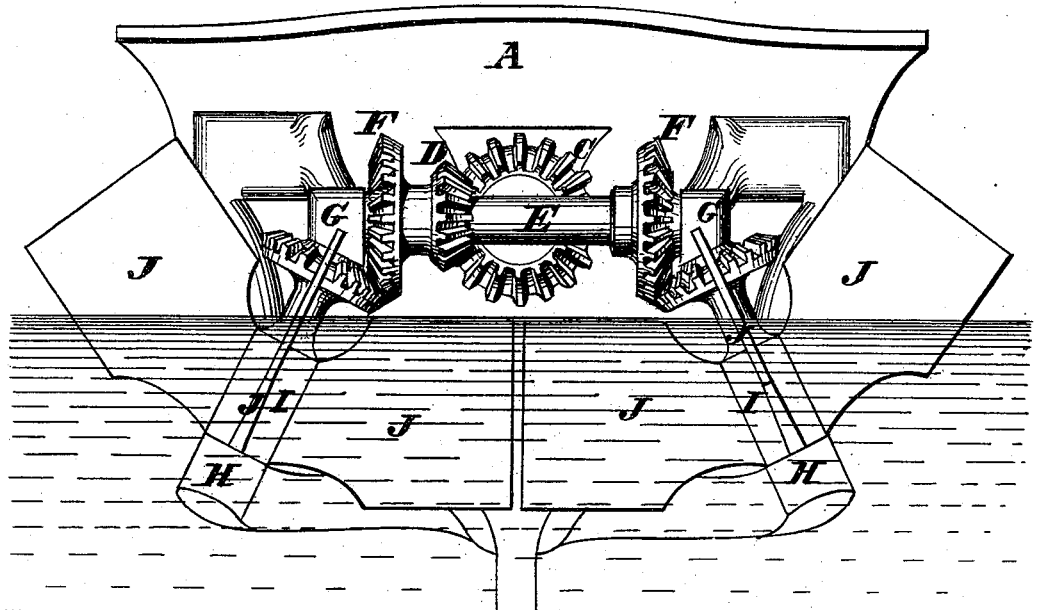
Figure 3:
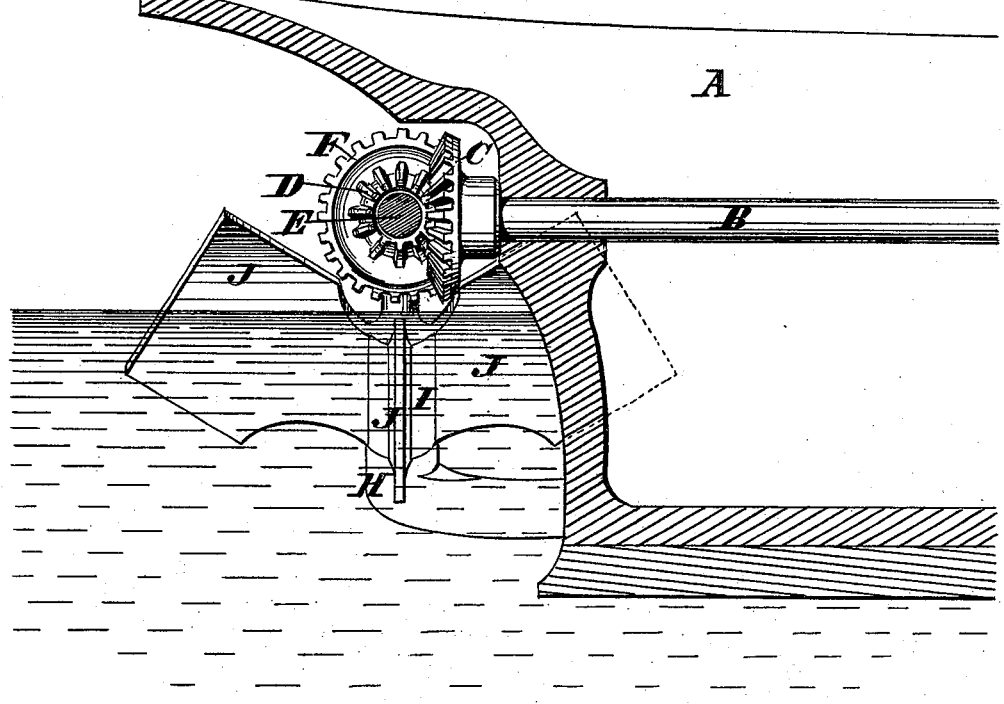
Figure 5:
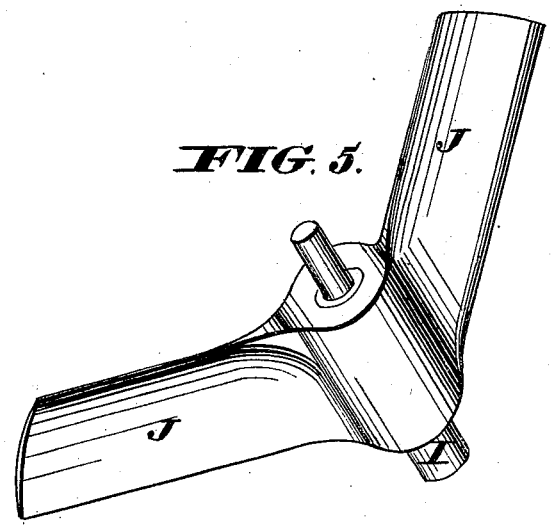
Figure 4:
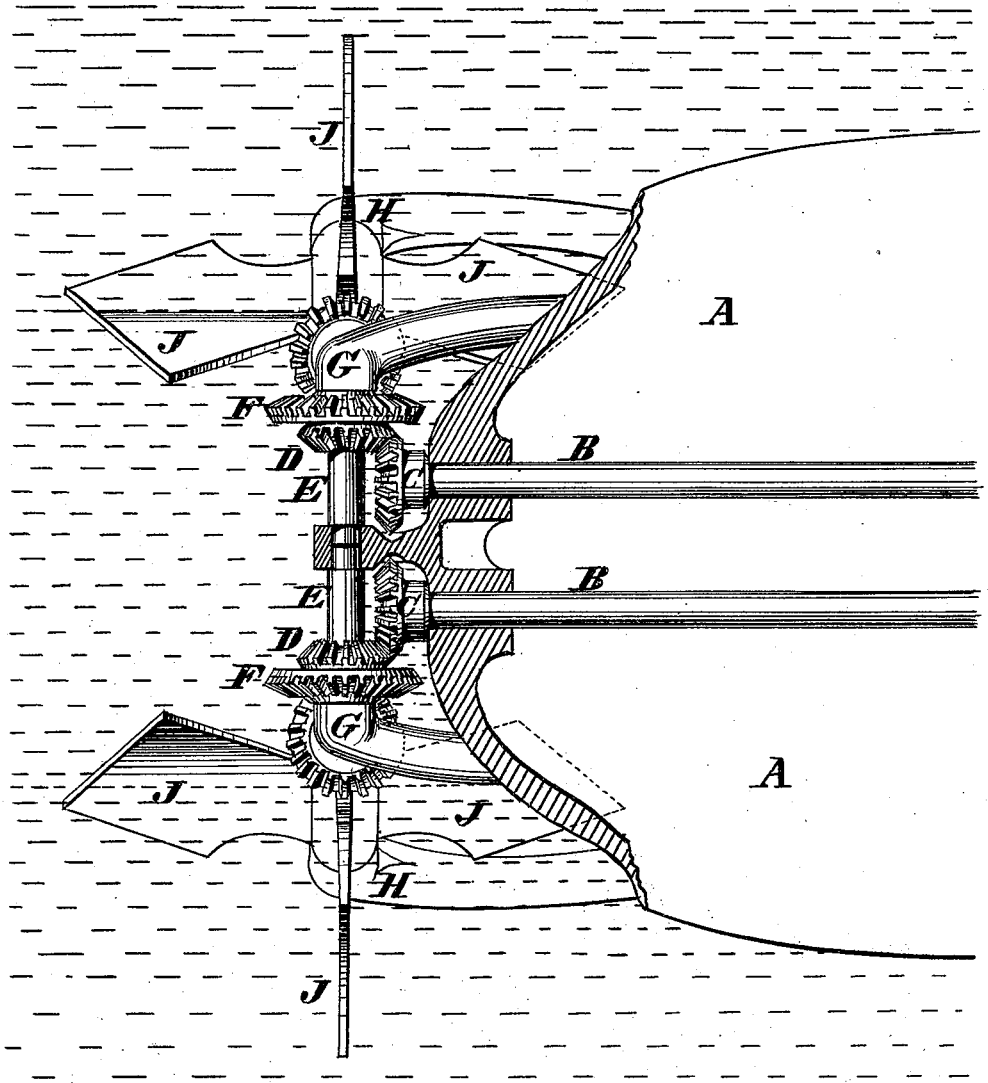

In the accompanying drawings, Figure 1 is a side elevation of a propeller illustrating the invention. Fig. 2 is a rear view of the same. Fig. 3 is a vertical longitudinal section thereof. Fig. 4 is a plan, partly in section, illustrating a modification in the mode of driving the paddle-wheels. Fig. 5 is a perspective view of a paddle-wheel of the modified form.

A may represent a part of the hull of a vessel of any size or character, either for ocean navigation, or for canal or inland use. B is a horizontal shaft, which may be mounted and driven in a manner similar to the shaft of a screw-propeller. The outboard end of the shaft B carries a pinion, C, gearing with a pinion, D, on a counter-shaft, E, which carries pinions F F near its respective ends, and has its bearings in brackets or housings G, attached to the hull. Additional housings H afford step-bearings for the oblique shafts I, which have their upper bearings in suitable boxes in the brackets G. Pinions on the shafts I mesh with the pinions F on the counter-shaft E. J J represent blades, of flat or curved form, projecting obliquely from the shafts I, in such a manner as to cause the said blades to assume a horizontal, or nearly horizontal, position when projecting inward or toward each other, and a nearly vertical position at the opposite side of their orbit. The blades may be flat, as illustrated in Figs. 1, 2, and 3, or concavo-convex, as illustrated in Fig. 5. The blades may be two or more in number on each wheel.

From an examination of the different positions assumed by the blades in their revolution it will appear, first, that in their meeting position, which is the central part of their effective stroke, they are horizontal and fully immersed, and their motion is in line with that of the vessel, in the opposite direction, of course, and perpendicular to their own surfaces; second, at the opposite part of their orbit they pass backward, in a nearly vertical position, out of the water, or nearly so; third, in leaving the water they occupy a plane parallel with the line of motion of the vessel, and in entering the water they are nearly in the same plane.

In the illustration shown in Fig. 4 the wheels are adapted to be driven independently by separate engines. By moving either alone, or moving either in excess of the other, the vessel may be steered as required; or, by revolving the wheels in opposite directions, the vessel may be turned around by forward or backward motion. The valves, to govern the relative or respective movements of the wheels, may be under control of the pilot as well as of the engine.

The blades may be adjusted to the hull at an angle ranging from thirty to forty-five degrees from the perpendicular, and the shaft so adjusted that the blades will be fully immersed in their horizontal position at mid-stroke.

The peculiar adjustment of the blade is such that as it enters the water its action is in the form of a shear-cut, with a compacting thrust to the center; and after the full force of the stroke is exerted the blade is quickly lifted from the water, and in its last contact with the water the blade is parallel with the flowing current, almost wholly avoiding the objectionable feature of lifting water, incident to the usual paddle-wheel, and as the blade enters the water its slight angular position tends to give buoyancy to the stern of the vessel. The action is similar to the stroke of an oar operated by a skillful hand.

If curved blades are used the degree of curvature will be varied as found appropriate, considering the speed of revolution, the length of the blade, and the kind of vessel to which it is applied.

By arranging the paddles in pairs, as shown, they are caused to hug or compress the water, throwing it directly aft with great force, without lateral or other non-effective motion.

The device constitutes an efficient propeller for vessels of all sizes and grades; but it is deemed especially adapted for vessels navigating shallow rivers, canals, and the like.

The following is claimed as new:

The twin-paddle propeller herein described, consisting of two wheels, with blades mounted obliquely on oblique shafts, converging upward, so as to adapt the wheels to operate in conjunction at the stern or stem of the vessel, as herein set forth.

N. A. PATTERSON.

Witnesses:
OCTAVIUS KNIGHT,
F. E. SMITH.